United States Patent [19]

Rodrigo et al.

[11] 4,064,221

[45] Dec. 20, 1977

[54] PROCESS FOR OBTAINING NITRIC ACID OF A CONCENTRATION HIGHER THAN THE AZEOTROPIC CONCENTRATION BY MEANS OF THE ABSORPTION OF NITROGEN OXIDES IN WATER OR DILUTED NITRIC ACID

[76] Inventors: Luis Marzo Rodrigo, Cebreros No. 76, Madrid 11; Jesus Marzo Rodrigo, Avda, Bruselas No. 69, Madrid 28, both of Spain

[21] Appl. No.: 720,559

[22] Filed: Sept. 7, 1976

[30] Foreign Application Priority Data

June 8, 1976 Spain ............................... 448675

[51] Int. Cl.$^2$ ............................................. C01B 21/40
[52] U.S. Cl. ..................................... 423/393; 423/394
[58] Field of Search ........................ 423/392, 393, 394

[56] References Cited

U.S. PATENT DOCUMENTS

| | | | |
|---|---|---|---|
| 2,088,057 | 7/1937 | Handforth | 423/392 |
| 2,098,953 | 11/1937 | Christensen | 423/392 |
| 2,123,467 | 7/1938 | Hobler | 423/394 |
| 3,399,965 | 9/1968 | Kalous | 423/392 |
| 3,716,625 | 2/1973 | Oberste-Berghaus | 423/393 |

*Primary Examiner*—G. O. Peters

[57] ABSTRACT

The present invention relates to a process for obtaining nitric acid of a concentration higher than the azeotropic concentration by means of the absorption of nitrogen oxides in water or diluted nitric acid and the partial pressure of the nitrogen oxides before absorption is raised partly by compression of the gases that contain the nitrous gases and partly by means of a cycle of diluted nitric acid which is decomposed by the action of the NO contained in the gases, enriching them in $NO_2$ and which subsequently reform by absorption of $NO_2$ in water when the partial pressure of the nitrogen oxides is low.

2 Claims, 1 Drawing Figure

U.S. Patent  Dec. 20, 1977  4,064,221
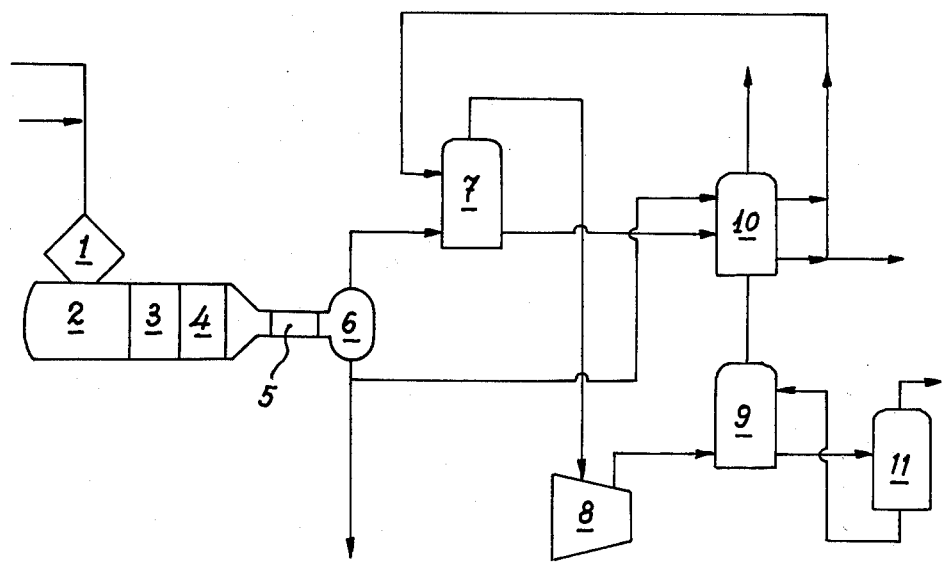

PROCESS FOR OBTAINING NITRIC ACID OF A CONCENTRATION HIGHER THAN THE AZEOTROPIC CONCENTRATION BY MEANS OF THE ABSORPTION OF NITROGEN OXIDES IN WATER OR DILUTED NITRIC ACID

This invention is concerned with a process for the manufacture of nitric acid of a concentration higher than the azeotropic concentration (68% by weight) with or without the simultaneous production of nitric acid of a concentration lower than the azeotropic concentration, by means of absorption of nitrogen oxides having a high degree of oxidation in water or in aqueous solutions of nitric acid, for which the partial pressure of the nitrogen oxides referred to is increased partly by decomposition of nitric acid by means of nitrogen oxides having a low degree of oxidation, and partly by compression at very high pressures of the gases that contain them.

Practically all the nitric acid produced industrially is obtained starting with ammonia by catalytic oxidation of the ammonia in accordance with the reaction:

$$4 NH_3 + 5 O_2 \rightarrow 4 NO + 6 H_2O + \text{Heat} \quad (I)$$

The quantity of reagent water formed is important and when it is desired to produce acid with a high concentration it is necessary to eliminate the water almost entirely since, as is shown in the bibliography, if the water referred to is not eliminated, the maximum concentration of nitric acid possible is of the order of 77%.

The NO (nitric oxide) is considered to be a nitrogenous oxide having a low degree of oxidation, which, in the presence of oxygen and at low temperatures oxidizes to $NO_2$ (nitrogen dioxide) of a high degree of oxidation in accordance with the reaction:

$$2 NO + O_2 \rightarrow 2 NO_2 + \text{Heat} \quad (II)$$

It is precisely this nitrogen dioxide (or its dimers) that are absorbed in water to form nitric acid in accordance with the reaction:

$$3 NO_2 + H_2O \rightarrow 2 NO_3H + NO + \text{Heat} \quad (III)$$

At a greater pressure of the nitrogen oxides that enter into contact with the water, a greater concentration of nitric acid may be obtained.

For reasons of safety, the maximum concentration of ammonia in the mixture with air for effecting reaction (I) does not usually exceed 12% if the reaction is carried out at low pressure, or 10% if its is carried out at high pressure.

The conventional processes for the production of nitric acid usually compress the gases before or after effecting reaction (I) up to the pressures of 4 or 5 atmospheres (medium pressure processes), 7 or 8 atmospheres (high pressure processes) and 10 to 12 atmospheres (very high pressure). Depending on the pressures at which reactions (I) and (II) are carried out, different processes are obtained, but all of them have in common the factor that the partial pressure of the highly oxidized nitrogen oxides at the beginning of the absorption stage is not usually sufficiently high to produce large percentages of acid of a concentration higher than the azeotropic concentration (68%).

Therefore, there are known processes for increasing the above-mentioned partial pressure in which, in addition to operating at high pressures, cycles of nitrogen dioxide are established by means of the absorption stage in such a way that $NO_2$ is added to the gases that enter into absorption and the part that is not absorbed is washed with nitric acid of 60 to 75% by weight, the washing acid is again expelled and returns to the beginning of the absorption zone. In these processes the gases are usually compressed immediately after they are cooled sufficiently to allow the water produced in accordance with reaction (I) to separate from the reagent gases. Consequently the oxidation of NO to $NO_2$ is easily achieved, since reaction (II) is favoured by high pressures and low temperatures.

In the process which is the subject of this invention, an increase of partial pressure of the nitrogen oxides is achieved on the one hand, by operating at very high pressures (in general higher than those of other known processes), and on the other hand, decomposing diluted nitric acid (of a concentration lower than the azeotropic concentration) in accordance with the inverse reaction to reaction (III), that is to say:

$$2 NO_3H + NO + \text{Heat} \rightarrow 3 NO_2 + H_2O \quad (IV)$$

The advantages of this form of operation are double: on the one hand the oxidation of NO to $NO_2$ is achieved almost completely, maintaining very low quantities of non-oxidized NO, which is required in order to achieve, by chemical absorption, nitric acid of a concentration higher than the azeotropic concentration.

On the other hand, as 3 mols of $NO_2$ are produced for every mol of NO, a very large increase is obtained in the $NO_2$ content of the reagent gases.

It is also important to indicate that both in the process that is proposed and in those already known, only part of the gases that are sent to the absorption zone will give rise to superazeotropic acid since, for reasons of chemical equilibrium, there is a partial pressure of nitrogen oxides in equilibrium with the acid of an azeotropic concentration and below the partial pressure referred to it is not possible to obtain acid with a concentration higher than the azeotropic concentration.

In the known processes, once the said partial pressure is attained, the gases are usually subjected to a washing (that is to say physical absorption) with nitric acid of average concentration (60 to 75%) at very low temperatures so that the recovery is achieved of almost all nitrogen oxides so that the emissions of oxides into the atmosphere is low. Furthermore, the washing acid charged with oxides is subsequently subjected to a desorption operation (generally by means of secondary air and operation at low pressure), and the $NO_2$ is recovered which is reincorporated into the cycle by means of the same secondary air.

In the process we propose, when the gases reach the partial pressure of equilibrium, they are absorbed with water, in accordance with reaction (III), giving rise to an acid with a concentration lower than the azeotropic concentration, which is precisely that which is utilized in order to oxidize the NO to $NO_2$ in accordance with reaction (IV). Furthermore, as the chemical absorption is effected at very high pressure, low emissions of oxides into the atmosphere are also achieved.

An additional advantage of the process proposed compared with those already known, is that on the $NO_2$ not being handled in the form of a gas, but the circulations being in liquid form, the starting up to these installations is considerably more simple and it is not necessary to effect any venting of the nitrous gases in emergency operations.

Both in the known processes and in the new process proposed, the acid of a concentration higher than the azeotropic concentration is subjected to a conventional distillation process with which there is obtained on the onw hand chemically pure nitric acid and on the other hand acid of azeotropic concentration which is reincorporated into the process.

The FIGURE is a simplified flow diagram in a plant in which the oxidation of ammonia is effected at low pressure (which presents the advantage that on the condensation of the water formed in accordance with reaction (I), the quantity of nitric acid transported by the water is minimal and, of course, very much less than that obtained in condensation processes with higher pressures).

In the diagram referred to, the tower in which the oxidation of NO to $NO_2$ is produced also functions at low pressure which presents the advantage compared with operation at higher pressures that the larger part of the nitrogen oxides are in the form of NO and therefore, taking into account that 3 mols of $NO_2$ are obtained for each mol of NO in accordance with reaction IV, the quantity of $NO_2$ is greater than can be achieved by the processes that operate at higher pressure in which the nitrogen oxides are usually displaced towards $NO_2$.

In accordance with the schematic diagram, the mixture of ammonia and air is mixed and reacts in the reactor 1, in accordance with reaction (I). The reagent gases are cooled in various heat exchangers 2, 3, and 4, whose operation is irrelevant for the purposes of the patent. In the cooler 5, the dew point of the gases is achieved, and the water formed in the previous reaction condenses and is separated in the cooler 6.

The water totally or partially extracted from the plant (in general as it contains a small amount of nitric acid) is usually worth recirculating one part to the tower (10) while the dry reagent gases are sent on to the oxidization system 7, where reaction IV takes place, thanks to the diluted nitric acid recirculated from the section of absorption 10. From the oxidation system two currents are obtained: the liquid current that is usually diluted nitric acid which is returned to 10 for its concentration, and the gaseous current, very rich in $NO_2$, which is sent to the compressor 8.

There the gases are compressed up to 6–15 atmospheres (preferably 10–13 atmospheres) with which the partial pressure of the nitrogen oxides is very highly (between 1 and 4 atmospheres) and is passed on to the superazeatropic absorption system 9.

In the system referred to the gases enter into contact with acid of azeotropic concentration proceeding from the distillation tower 11, with which the concentration of acid is increased and the partial pressure of the nitrogen oxides is diminishes to values close to the equilibrium with azeotropic acid.

The acid of a concentration higher than the azeotropic concentration is distilled in the column 11, and gives two currents, one of practically pure nitric acid and the other of azeotropic acid that is returned to the system 9.

With regard to gases poor in $NO_2$, they pass to the subazeotropic absorption system 10, where in countercurrent with water or aqueous solutions of nitric acid they are absorbed, giving rise to an acid of a concentration lower than the azeotropic concentration, which is wholly or partially returned to the oxidation system 7.

The system is sufficiently versatile so that the respective proportions of diluted nitric acid and pure nitric acid may be varied at will between 0 and 100%.

The current of gases from which the nitrogen oxides have been eliminated is heated in conventional heat exchangers and recovers its energy generally by means of an expansion turbine coupled to a compressor group with which the energy consumption of the compressor is considerably reduced.

What is claimed is:

1. A process for obtaining nitric acid of a concentration higher than the azeotropic concentration by means of the absorption of nitrogen oxides in diluted nitric acid, comprising the steps of:

reacting gases containing nitrogen oxides with dilute subazeotropic nitric acid to partially decompose the nitric acid by the action of NO contained in the gases, forming additional $NO_2$ to increase the partial pressure of $NO_2$ in the gases;

subsequently compressing the gases;

passing azeotropic nitric acid and the compressed gases containing the high partial pressure of $NO_2$ through an absorption chamber to form superazeotropic nitric acid;

distilling the super-azeotropic nitric acid to separate it into commercially pure nitric acid and azeotropic nitric acid;

returning the azeotropic nitric acid to the absorption chamber for use in said passing step;

injecting the gases which have been passed through said absorption chamber into a secondary absorption chamber to react with the partially decomposed dilute nitric acid from said reacting step to form sub-azeotropic nitric acid; and returning at least a portion of said sub-azeotropic acid for use in said reacting step.

2. The method of claim 1, further comprising the step of removing water from the gases prior to said reacting step.

* * * * *